July 25, 1961  A. J. DIFFIE  2,993,987
MOTOR VEHICLE HEADLIGHT
Filed Dec. 2, 1958
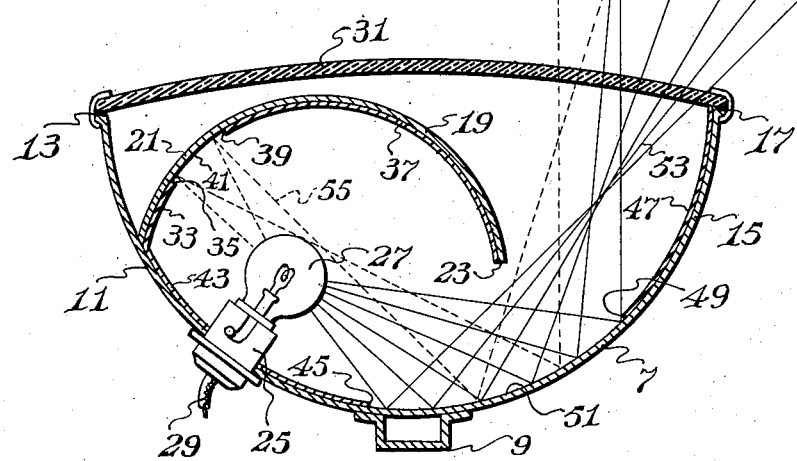
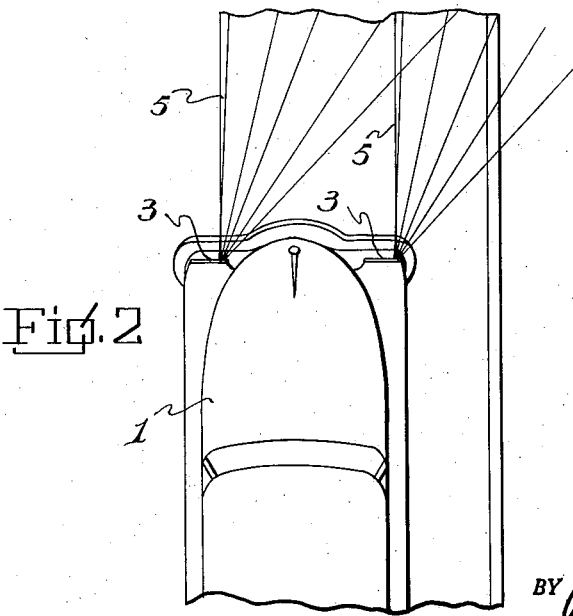
Alfred J. Diffie
INVENTOR.
BY Robert J. Bain
ATTY United States Patent Office 2,993,987
Patented July 25, 1961

2,993,987
MOTOR VEHICLE HEADLIGHT
Alfred J. Diffie, 1008 E. 19th St., Tulsa, Okla.
Filed Dec. 2, 1958, Ser. No. 777,727
1 Claim. (Cl. 240—41.1)

The present invention relates to a motor vehicle headlight, and more particularly to non-glare headlights designed to minimize the light reaching the eyes of drivers of oncoming vehicles.

An object of the present invention is the provision of a headlight so constructed as to direct its beams only forwardly and to the right side of the road.

Another object of the present invention is the provision of a non-glare headlight which can be constructed with the least modification of existing headlight designs.

Finally, it is an object of the present invention to provide a non-glare headlight which will be simple and inexpensive to manufacture and install and rugged and durable in use.

Other objects and advantages of the present invention will become apparent from a consideration of the following description, taken in connection with the accompanying drawing, in which:

FIGURE 1 is a sectional view from above of a headlight according to the present invention; and FIGURE 2 is a plan view of a motor vehicle equipped with headlights according to the present invention and showing the manner of direction of the headlight beams.

Referring now to the drawing in greater detail, there is shown a motor vehicle such as an automobile 1 equipped with a pair of headlights 3 according to the present invention, the beams 5 of which are shown in FIGURE 2 to extend only forwardly and to the right of the direction of forward motion of the vehicle.

The structure of the headlight 3 is shown in greater detail in FIGURE 1 to include a concave, forwardly opening rear wall 7 having attachment means 9 on its rear side for mounting in the usual manner on a motor vehicle. Rear wall 7 terminates at one side 11 thereof in an edge 13 and at the other side 15 thereof in an edge 17.

Secured to side 11 of rear wall 7 is a concave, rearwardly opening forward wall 19 which extends from its point of securement to rear wall 7 at one side 21 of forward wall 19 toward side 15 of rear wall 7 but terminates short of rear wall 7 in a free edge 23 spaced from rear wall 7 by a gap. Thus, forward wall 19 masks only a portion of rear wall 7 as seen from the front.

Extending through rear wall 7, and specifically through side 11 thereof, is means for mounting an electric light within the confines of rear wall 7, comprising an electric light socket 25 adapted to have detachably mounted thereon an electric light 27 selectively actuable from a power source (not shown) through wires 29 in the usual manner. The over-all assembly is completed by a light penetrable panel closing the front of rear wall 7, in the form of the usual glass lens 31.

It is especially to be noted that forward wall 19 is spaced behind lens 31 and that the point of securement of forward wall 19 to rear wall 7 is spaced a substantial distance from edge 13. In this way, a compact configuration is achieved in which forward wall is disposed entirely within the space enclosed by rear wall 7 and lens 31 but at the same time is out of contact with lens 31 to prevent rattling and breaking of any portion of the headlight assembly.

The particular non-glare qualities of the headlight of the present invention are achieved by particular arrangements of reflective and non-reflective surface portions of rear wall 7 and forward wall 19. In the illustrated embodiment, the reflective portions are uncoated portions of polished steel or silvered glass or the like, while the non-reflective surface portions have the reflective portions as a substrate but are coated with carriage black or other non-reflective substance or are otherwise rendered non-reflective relative to the reflective portions of these surfaces.

Thus, the rear surface of forward wall 19 is provided with a non-reflective surface portion 33 which extends from rear wall 7 toward free edge 23 but terminates in a first line 35. The rear surface of forward wall 19 is also provided with a non-reflective surface portion 37 which extends from free edge 23 toward side 11 of rear wall 7 but terminates in a second line 39. Lines 35 and 39 are spaced apart and the rear surface of forward wall 19 between these lines comprises a first highly reflective surface portion 41.

The front surface of rear wall 7 is provided with a non-reflective surface portion 43 which extends from the point of securement of forward wall 19 to rear wall 7, beyond socket 25 toward side 15 of rear wall 7 but terminates in a third line 45. The front surface of rear wall 7 is also provided with a non-reflective surface portion 47 which extends from edge 17 toward side 11 of rear wall 7 but terminates in a fourth line 49. Third and fourth lines 45 and 49 are spaced apart and the front surface of rear wall 7 between these lines comprises a second highly reflective surface portion 51.

The paths of the rays from light 27 may now be traced. The rays 53 which are shown in full line in FIGURE 1 are those from light 27 which impinge directly on highly reflective surface portion 51 of rear wall 7 and are thence reflected through the gap and between edges 23 and 17. It is to be noted that all of these rays are directed either directly forwardly or to the right as seen in FIGURE 1, which is toward the right side of the road when the headlight is installed in a moving motor vehicle. For this purpose, the position of line 49 is important, as it is noted that if rays 53 could be reflected from non-reflective surface portion 47, they would be directed toward the left as seen in FIGURE 1 and would represent rays that would strike the eyes of oncoming motorists.

The rays 55 shown in broken line in FIGURE 1 represent the rays from light 27 which impinge directly on highly reflective surface portion 41 of forward wall 19. These rays are reflected back to highly reflective portion 51 of rear wall 7 and thence through the gap and between edges 23 and 17, all of rays 55 being directed either straight to the front or off to the right as seen in FIGURE 1, thereby reinforcing the illuminating effect of rays 53. None of these rays 55 is directed toward the left as seen in FIGURE 1; and to achieve this, it should be noted that line 35 is so positioned that non-reflective surface portion 33 does not reflect those rays which, upon re-reflection from surface portion 51 would be biased to the left.

As further important features contributing to this desirable result, it should be noted that light 27 is not centered within the curve of forward wall 19 but is off to the left, so that portions of forward wall 19 are progressively farther from light 27 passing from left to right. This assures that the light from light 27 striking forward wall 19 will not merely be reflected back to the light source but will pass on beyond light 27 to strike the reflective portions of the rear wall.

The embodiment of the drawing is of uniform cross-sectional configuration throughout its height, so that rear wall 7 in effect tends to be somewhat semi-cylindrical about a vertical axis, as does also forward wall 19. According to this construction, headlight 3 would have a rectangular configuration as viewed from the front. However, it is obviously also within the present invention to provide for headlight configurations which are circular or otherwise curved as viewed from the front, in which case lines 35, 39, 45 and 49 will of course also be curved appropriately to the over-all configuration of the headlight.

Also, the term "non-reflective" as used herein is not to be construed as limited to zero reflectivity, as it is necessary only that the non-reflective surfaces reflect no more than a fraction of the light reflected by the highly reflective surfaces. Thus, it is not necessary that the non-reflective surfaces be flat black, as they could also have a lighter, dull satin finish which would be non-reflective within the meaning of the present invention as compared to the highly reflective surfaces and would transmit to the eyes of oncoming motorists a dull glow.

In view of the manner in which the headlight of the present invention assures that its beams will be cast only forwardly and to the right side of the road, and in view of the simple, sturdy and compact arrangement and construction of the headlight of the present invention, it will be apparent that all of the initially recited objects of this invention have been achieved.

Although this invention has been described and illustrated in connection with a preferred embodiment, it is to be understood that modifications and variations may be resorted to without departing from the spirit of the invention as those skilled in this art will readily understand. Such modifications and variations are considered to be within the purview and scope of the present invention as defined by the appended claim.

What is claimed is:

A motor vehicle headlight having a forwardly opening concave rear wall and a forward wall extending from one side of the rear wall toward the other side of the rear wall but terminating short of the rear wall in a free edge spaced from the rear wall by a gap, the rear wall terminating at its other side in an edge, and means extending through the rear wall and mounting an electric light behind the forward wall, the rear surface of the forward wall having a non-reflective surface portion extending from the rear wall toward said free edge and terminating in a first line and a non-reflective surface portion extending from said free edge toward said one side of the rear wall and terminating in a second line, the rear surface of the forward wall having a first highly reflective surface portion between said first and second lines, said first highly reflective surface portion being concave and opening to the rear, the front surface of the rear wall having a non-reflective surface portion extending from the forward wall beyond said means toward said other side of the rear wall and terminating in a third line and having a non-reflective surface portion extending from said edge of said rear wall toward said one side of the rear wall and terminating in a fourth line, the front surface of the rear wall having a second highly reflective surface portion between said third and fourth lines, said third and fourth lines being so disposed that the light from said electric light which impinges directly on said second highly reflective surface is reflected through said gap and between said edges and only forwardly and to one side of the headlight, said first, second, third and fourth lines being so disposed that the light from said electric light which impinges directly on said first highly reflective surface is reflected to said second highly reflective surface and is reflected from said second highly reflective surface through said gap and between said edges and only forwardly and to said one side of the headlight.

References Cited in the file of this patent

UNITED STATES PATENTS

| | | |
|---|---|---|
| 2,236,942 | Frazier | Apr. 1, 1941 |
| 2,813,969 | Schofield | Nov. 19, 1957 |